United States Patent [19]

Haas et al.

[11] 4,252,890
[45] Feb. 24, 1981

[54] IMAGING SYSTEM WHICH AGGLOMERATES PARTICULATE MATERIAL

[75] Inventors: Werner E. L. Haas, Webster; James E. Adams, Ontario; Bela Mechlowitz, Rochester, all of N.Y.

[73] Assignee: Xerox Corporation, Stamford, Conn.

[21] Appl. No.: 845,699

[22] Filed: Oct. 26, 1977

Related U.S. Application Data

[60] Division of Ser. No. 84,018, Oct. 26, 1970, Pat. No. 4,084,966, which is a continuation-in-part of Ser. No. 755,163, Aug. 26, 1968, abandoned.

[51] Int. Cl.³ .................... G03C 5/04; G01D 15/10
[52] U.S. Cl. .................. 430/292; 346/76 R; 346/76 L; 427/56.1; 427/161; 430/17; 430/296; 430/330; 430/346; 430/348; 430/496; 430/944; 430/945
[58] Field of Search .............. 96/1 PS, 27 E, 27 R; 427/161, 56; 360/56; 346/153, 158, 160, 76 R, 76 L; 430/17, 41, 292, 296, 330, 346, 348, 496, 944, 945

[56] References Cited

U.S. PATENT DOCUMENTS

| | | | |
|---|---|---|---|
| 2,552,209 | 5/1951 | Murray | 427/56 |
| 3,032,414 | 5/1962 | James et al. | 96/75 X |
| 3,266,045 | 8/1966 | Schaffert | 346/76 R X |
| 3,316,119 | 4/1967 | Anderson et al. | 346/76 R X |
| 3,510,419 | 5/1970 | Carreira | 96/1.3 X |
| 3,556,781 | 1/1971 | Levy et al. | 96/1 |
| 3,619,157 | 11/1971 | Brinckman | 430/346 |
| 3,716,844 | 2/1973 | Brodsky | 430/346 |
| 3,820,984 | 6/1974 | Gundlach | 96/1 PS |
| 3,912,505 | 10/1975 | Goffe et al. | 96/1.2 |
| 3,975,195 | 8/1976 | Goffe | 96/1 PS |
| 4,000,334 | 12/1976 | Hallman et al. | 427/56 |
| 4,007,042 | 2/1977 | Buckley et al. | 96/1 PS |
| 4,013,462 | 3/1977 | Goffe et al. | 96/1 PS |

Primary Examiner—Edward C. Kimlin

[57] ABSTRACT

An imaging system wherein a migration-type imaging member comprising a softenable layer containing agglomerable migration marking material is provided, and the member is exposed to an image pattern of electromagnetic radiation of sufficient energy to cause a simultaneous imagewise migration at least in depth in the softenable layer and agglomeration of the agglomerable migration marking material in the imagewise exposed areas of the imaging member. In another embodiment, a microscopically discontinuous layer of imaging material on a stable substrate is agglomeration or evaporation imaged by the inventive system.

11 Claims, 6 Drawing Figures

IMAGING SYSTEM WHICH AGGLOMERATES PARTICULATE MATERIAL

CROSS-REFERENCE TO RELATED APPLICATIONS

This is a division of application Ser. No. 84,018 filed Oct. 26, 1970, now U.S. Pat. No. 4,084,966, granted Apr. 18, 1978, which is a continuation-in-part of copending U.S. Patent Application Ser. No. 755,163, filed Aug. 26, 1968 now abandoned.

BACKGROUND OF THE INVENTION

This invention relates in general to imaging, and more specifically, to a novel, one-step imaging system. Various methods are known for forming visible images in response to a light and shadow image pattern. In many of the common methods the appearance of a light sensitive chemical composition is changed by the action of the light upon the composition. For example, photography and blueprinting are photochemical methods. Other methods are known wherein light is used to alter the hardness, tackiness, solvent resistance, or ink receptivity of various suitable materials.

In recent years, other methods which make use of the electrical properties of photosensitive or photoconductive materials, as distinguished from the chemical properties of imaging compositions, have come into widespread use. For example, a layer of an electrically photosensitive material may be electrically charged and exposed to a pattern of light or other activating electromagnetic radiation, and the resultant electrical pattern, sometimes called an electrical latent image, may be used to control the selective attraction or repulsion of some form of electroscopic marking material to or from the surface of the photosensitive material. In still other systems, electrical conductivity patterns or electrical latent images may be used to control electro-chemical reactions or to create geometrical changes, i.e. deformations, at the surface of imaging compositions. Still other imaging methods have been developed which comprise exposing a layer of a semiconductor material to an imagewise pattern of activating electromagnetic radiation thereby producing a latent image in the semiconductive layer.

There has also recently been developed a migration imaging system capable of producing high quality images of high density, continuous tone, and high resolution. This system is described and claimed in U.S. Pat. Nos. 3,975,195 and 4,013,462. In a typical embodiment of this imaging system an imaging member comprising a substrate, a layer of softenable material and electrically photosensitive marking material is latently imaged by electrically charging the member and exposing the charged member to a pattern of activating electromagnetic radiation, such as light. Where the photosensitive migration marking material was originally in the form of a fracturable layer at the upper surface of the softenable layer, particles of the migration marking material in the exposed areas of the imaging member migrate toward the substrate when the member is developed by decreasing the resistance of the softenable layer to migration of the marking material towards said substrate.

There are various other systems for forming such images, wherein non-photosensitive or photosensitively inert, marking materials are arranged in fracturable layers or dispersed throughout the softenable layer in a binder configuration, as described in the aforementioned copending applications which also disclose a variety of methods which may be used to form latent images upon such migration imaging members.

Various means for developing the latent images in the novel migration imaging system may be used. These development methods include solvent wash-away, solvent vapor softening, heat softening, and combinations of these methods, as well as any other method which changes the resistance of the softenable material to the migration of particulate marking material through said softenable layer to allow imagewise migration of the particles toward the substrate. In the solvent wash-away development method, the migration marking material migrates in imagewise configuration toward the substrate through the softenable layer as it is softened and dissolved, leaving an image of migration particles corresponding to the desired image pattern on the substrate, with the material of the softenable layer substantially completely washed away. In the heat or vapor softening development modes, the softenable layer is softened or its viscosity is decreased, to allow imagewise migration of marking material toward the substrate and the developed imaged member generally comprises the substrate having migrated marking particles near the softenable layer-substrate interface, with the softenable layer and unmigrated marking particles intact on the substrate in substantially their original condition.

In one system, as described in copending application Ser. No. 71,781, filed Sept. 14, 1970, a migration developed image is at least in part imagewise transparentized by selectively agglomerating the marking material in either the image or background areas of the imaged member.

All of the above imaging systems typically require a development step or steps to bring the latently imaged member or imaging composition to a developed imaged form, i.e. a form wherein the image is typically visible to the human eye. In the various systems described above, such development steps may variously require the use of electrical, chemical, or other means to accomplish the desired result. The present invention relates to a new and advantageous system for instantaneously imaging a migration-type imaging member without necessitating any specific additional development steps to achieve a visible image.

SUMMARY OF THE INVENTION

It is, therefore, an object of this invention to provide a novel imaging system.

It is another object of this invention to provide a novel migration imaging system.

It is another object of this invention to provide a novel imaging system wherein migration marking material is selectively displaced in image configuration in a layer of softenable material.

It is another object of this invention to provide an imaging system wherein no separate development or fixing steps are required.

It is another object of this invention to provide a novel imaging system wherein a visible image is immediately produced upon exposure to a pattern of electromagnetic radiation in the desired image configuration.

It is another object of this invention to provide a system for producing visible images with greater speed and simplicity than former imaging systems.

It is another object of this invention to provide a migration imaging system producing high contrast density images.

It is yet another object of this invention to provide a high quality, dry processed migration imaging system.

It is still another object of this invention to provide a high quality imaging system which is addressed by the application of radiant energy rather than by applied chemical or electrical means.

The foregoing objects and others are accomplished in accordance with this invention by providing an imaging system wherein a migration-type imaging member comprising a softenable layer containing agglomerable migration marking material is provided and the member is exposed to an image pattern of electromagnetic radiation of sufficient energy to cause a simultaneous imagewise migration at least in depth and agglomeration of the agglomerable migration marking material in the imagewise exposed areas of the imaging member.

BRIEF DESCRIPTION OF DRAWINGS

For a better understanding of the invention as well as other objects and other features thereof, reference is made to the following detailed disclosure of preferred embodiments of the invention taken in conjunction with the accompanying drawings thereof, wherein.

DESCRIPTION OF THE PREFERRED EMBODIMENTS

Figure 1:
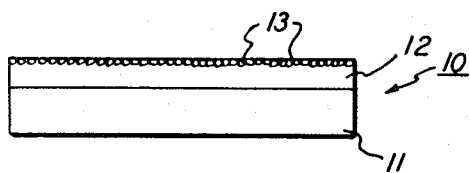
FIG. 1 is a partially schematic, cross-sectional view of the migration imaging member suitable for use in the present invention.

Referring now to FIG. 1, a migration-type imaging member suitable for use in the present invention is illustrated in partially schematic, cross-sectional view wherein the imaging member 10 comprises supporting substrate 11 supporting a layer of softenable layer 12 containing agglomerable migration marking material 13, here arranged in a fracturable layer of the migration marking material contiguous the upper surface of the softenable layer.

Figure 2:
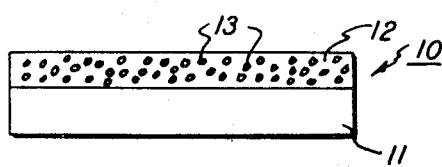
FIG. 2 is a partially schematic, cross-sectional view of another embodiment of the migration imaging member suitable for use in the present invention.

In FIG. 2, the migration-type imaging member comprises supporting substrate 11 having a layer of softenable material 12 thereon. However, in this configuration the agglomerable migration marking material 13 is dispersed throughout the softenable layer 12 in a binder structure configuration.

Figure 3:
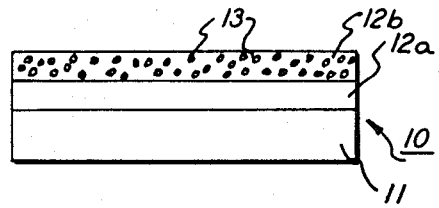
FIG. 3 is a partially schematic, cross-sectional view of another migration imaging member suitable for use in the present invention.

In FIG. 3 the migration-type imaging member comprises the substrate 11 supporting a first softenable layer 12a which is substantially free of any migration marking material, and a second softenable layer 12b containing migration marking material 13, here dispersed throughout the softenable layer 12a in a binder structure configuration.

Now U.S. Pat. Nos. 3,975,195, and 4,013,462, describe layered and binder-type migration imaging systems and members suitable for use in the present invention in great detail, and all of the disclosure therein, and especially the disclosure relating to such imaging members and materials suitable for use in the migration-type imaging members used herein, is hereby incorporated by reference in the present specification.

The materials suitable for use as substrate 11 and softenable layers 12 may typically be the same materials disclosed in the aforementioned copending applications which are incorporated by reference herein. The substrate 11 may in various embodiments have any desired property; for example it may be opaque, translucent, transparent, electrically insulating, electrically conductive, or semi-conductive, or have any other desired property. The substrate and/or the entire, migration-type imaging member which it supports may be in any suitable form including a web, laminate, or the like, strip, sheet, coil, cylinder, drum, endless belt, endless moebius strip, circular disc, or other desired shape. The present invention is particularly suitable for use in any of these configurations. Typical substrate materials may include, for example, materials such as copper, brass, aluminum, steel, cadmium, silver, gold. NESA glass, a partially transparent tin oxide coated glass available from Pittsburgh Plate Glass Company; aluminized Mylar, a Mylar polyester film from the E. I. DuPont de Nemours Co. Inc., having a thin, semi-transparent aluminum coating; Mylar itself, a polyethylene terephthalate resin film; coated with copper or copper iodide; Teflon, polytetrafluoroethylene available from DuPont; polyamide films; plastic coated papers; polyethylene; glass, and others.

The softenable layer 12 may comprise any suitable softenable material from which the advantageous migration-type imaging members of the present invention may be prepared and subsequently imaged by the advantageous system of the present invention. This softenable layer will typically comprise a heat softenable composition that may include any suitable material such as Staybelite Ester 10, a 50 percent hydrogenated rosin ester; Foral Ester, a hydrogenated rosin triester; and Neolyne 23, an alkyd resin, all from Hercules Powder Co,; SR 82, SR 84, silicone resins, both obtained from General Electric Corporation; Sucrose Benzoate; Eastman Chemical; Velsicol X-37, a polystyrene-olefin copolymer from Velsicol Chemical Corp.; hydrogenated Piccopale 100, a highly branched polyolefin, Piccotex 100, polystyrenevinyl toluene, Piccolastic A-75, 100 and 125, all polystyrenes, Piccodiene 2215, a polystyrene-olefin copolymer, all from Pennsylvania Industrial Chemical Co.; Araldite 6060 and 6071, epoxy resins available from Ciba; R5061A, a phenylmethyl silicone resin, from Dow Corning; Epon 1001, a bisphenol A-epichlorohydrin epoxy resin, from Shell Chemical Corp.; and PS-2, PS-3, both polystyrenes, and ET-693, a phenolformaldehyde resin, from Dow Chemical; and a custom synthesized about 79/21 mole percent copolymer of styrene and nexylmethacrylate; paraffins and waxes; and any other material which is softenable when used in the advantageous system of the present invention.

The above group of materials is not intended to be limiting, but merely illustrative materials suitable for use in the softenable layer in the present invention. The softenable material may have any other desired property which does not otherwise impair imaging by the inventive system. In addition to the materials named above, materials suitable for use in the present invention are listed in copending application Ser. No. 27,890, filed Apr. 13, 1970, and now abandoned, which is hereby entirely incorporated by reference in the present specification.

Softenable layers may be prepared by any suitable means. For example, a solvent solution of the softenable material may be applied to a suitable substrate by roll coating. Generally, any method for providing a thin, substantially smooth film of the softenable material is satisfactory.

Softenable layers are preferably of thicknesses in a range between about ½ micron and about 16 microns, and softenable layers of thicknesses between about 1 and about 4 microns provide optimum imaging results. In some embodiments, the material comprising the softenable layer may itself possess sufficient integrity so that the softenable layer containing or supporting the agglomerable migration marking material may be self-supporting. Such self-supporting softenable layers may be used in conjunction with any suitable substrate at any time before, during or after the imaging process.

"Softenable" as used herein is intended to mean any material which can be rendered more permeable thereby enabling particles to migrate through its bulk. Conventionally, changing the permeability of such material, reducing its viscosity, or reducing its resistance to migration of migration marking material is accomplished by dissolving, melting, and softening, by methods, for example, such as contacting with heat, vapors, partial solvents, solvent vapors, solvents, or combinations thereof, or by otherwise reducing the viscosity of the softenable material.

The migration marking material 13 may comprise any suitable agglomerable migration marking material. The term "agglomerable" and its variant forms herein refers to any material capable of agglomerating, flocculating, or clustering, and coalescing or fusing, with other particles or portions of the same material when processed in accordance with the present invention.

Materials particularly preferred as agglomerable migration materials because of their ability to function as both migration materials and agglomerable materials, include materials comprising selenium, including amorphous selenium, crystalline selenium, selenium-tellurium alloys, tellurium, arsenic, zinc, sulfur, gallium, cobalt tricarbonyl; thermoplastics or dyed thermoplastics such as polyoctylacrylate, polylaurylmethacrylate; dyed waxes; dyed paraffins, and others. Such materials may be dyed with any suitable material, such as phthalocyanine dyes, fluorescein dyes, or any other dye colorant; a host of materials suitable for use as such dyes is set forth in U.S. Pat. No. 3,384,488. In addition, the agglomerable marking material may comprise particulate material comprising an agglomerable matrix which contains smaller pigment particles. For example, the thermoplastic materials listed above are particularly suitable for such large particle matrices, while any suitable pigment such as zinc oxide, titanium dioxide, lead oxide, phthalocyanine pigments, or other suitable marking pigment may be used as pigment particles in the agglomerable migration material matrix. It has been found that the agglomerable migration marking materials of the present invention preferably have low glass transition temperatures so that they may agglomerate, fuse, and coalesce readily in the advantageous system of the present invention.

These agglomerable migration marking materials are contained in the softenable layer in fracturable layers or in dispersed particulate form in such particle sizes and particle spacing conditions that when the softenable layer is processed by the advantageous system of the present invention the particles or adjacent portions of the agglomerable marking materials are capable of agglomerating or flocculating together and/or coalescing or fusing into larger masses. The agglomerated mass of marking material typically has a lesser total cross-sectional area (in the plane of the surface of the imaging member) than the total cross-sectional area of the material as originally dispersed in the softenable layer, and this decrease in density in the processed areas of the imaging member creates contrast between the imaged and background areas. As disclosed in the incorporated disclosures, particles of the agglomerable migration marking material suitable for use in the present invention are preferably of average size not greater than about 2 microns. Submicron particles give even more satisfactory results, with an optimum range of particle size comprising particles of average size not greater than about 0.5 microns. When the migration marking material is arranged in a fracturable layer contiguous the surface of the softenable layer spaced apart from any supporting substrate, such fracturable layers are preferably of thicknesses in the range of between about 0.01 and about 2.0 microns, although fracturable layers of thicknesses of about 5 microns have been found to give good results in various embodiments.

Where migration-type imaging members containing agglomerable migration marking materials or particles are to be processed by the inventive system to cause agglomeration and fusing, it is preferable that such particles or portions of the agglomerable material have particle-to-particle spacings of not greater than about ½ micron, although in some embodiments, larger particle-to-particle spacings are suitable. Such particle-to-particle spacings facilitate the agglomeration, flocculation, coalescence, and fusing, of the agglomerable migration marking materials.

"Fracturable" layer or material as used herein, means any layer or material which is capable of breaking up during imaging by the inventive system, thereby permitting portions of said layer to migrate in depth in the softenable layer. The fracturable layer may be particulate, semi-continuous, or microscopically discontinuous in various embodiments of the migration-type imaging members of the present invention. Such fracturable layers of agglomerable migration marking material are typically contiguous the surface of the softenable layer spaced apart from any substrate, and such fracturable layers may be near, at, coated onto, or slightly, partially, or substantially embedded in the softenable layer in various embodiments of the imaging members. "Contiguous" for the purpose of this invention is defined as in *Webster's New Collegiate Dictionary*, Second Edition, 1960: "In actual contact; touching; also, near, not in contact; adjoining," and is intended to generically describe the relationship of the fracturable layer of agglomerable migration marking material in the softenable layer vis-a-vis the surface of the softenable layer spaced apart from any supporting substrate.

Fracturable layers of agglomerate migration marking material may be provided by any suitable means. For example, such fracturable layers may be provided by vacuum evaporating agglomerable migration marking material onto the softenable layer, or finely ground agglomerable migration material may be mixed with larger carrier granules of the type known for use in xerographic developers, and this mixture may be cascaded over the surface of the softenable layer which may be slightly softened, thereby providing a closely packed fracturable layer of particulate agglomerable migration marking material contiguous the surface of the softenable layer.

A particularly preferred method of providing fracturable layers of agglomerable migration marking material is the vacuum evaporation method disclosed in U.S. Patent applications Ser. No. 423,167, filed Jan. 4, 1965, now abandoned; application Ser. No. 813,345, filed Apr. 3, 1969, now abandoned; and U.S. Pat. No. 3,598,644, where a fracturable microscopically discontinuous layer of selenium is formed on a softenable layer. The fracturable layers of selenium provided by this method, when viewed under a microscope show either a network of cracks or apertures or a network of dark lines indicating the microscopically discontinuous nature of the fracturable layer. Electron micrographs show that particularly suitable fracturable layers actually comprise discrete spherical particles, for example, of amorphous selenium.

Where the fracturable layer is formed by cascading or dusting the agglomerable migration marking material onto or into the softenable material, the method shown in U.S. Pat. No. 3,520,681 may be used.

When the binder structure is used, the method set forth in U.S. Pat. No. 3,121,006 as well as U.S. Pat. No. 3,975,195 may be used to form suitable binder structure migration-type imaging members.

Figure 4:
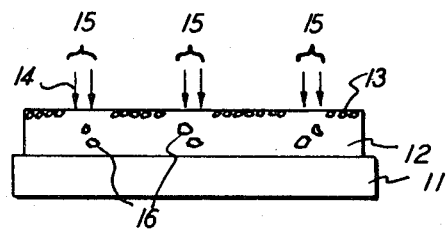
FIG. 4 is a partially schematic, cross-sectional view of an imaging member such as the one described in FIG. 1 being imaged by the inventive system.

The advantageous system of the present invention is schematically described in FIG. 4 where an imaging member 10, for example here like the one illustrated in FIG. 1, is shown being imagewise exposed to an image pattern of electromagnetic radiation of sufficient energy to cause a simultaneous imagewise migration at least in depth in the softenable layer and agglomeration of the agglomerable migration marking material in the imagewise exposed areas of the imaging member. In FIG. 4, the electromagnetic radiation 14 is shown impinging upon the imaging member in areas 15 wherein the agglomerable migration marking material 13 is shown to be migrated at least in depth in the softenable layer and agglomerated and fused into larger particles 16 which have smaller effective cross-sectional areas (in the plane of the imaging member) than similar volumes of the migration marking material 13 in its initial form in the migration-type imaging member. It is believed that electromagnetic energy of the aforementioned desired energy is capable of causing a heating effect in the imaging member which is imaged by the inventive system.

Figure 5:
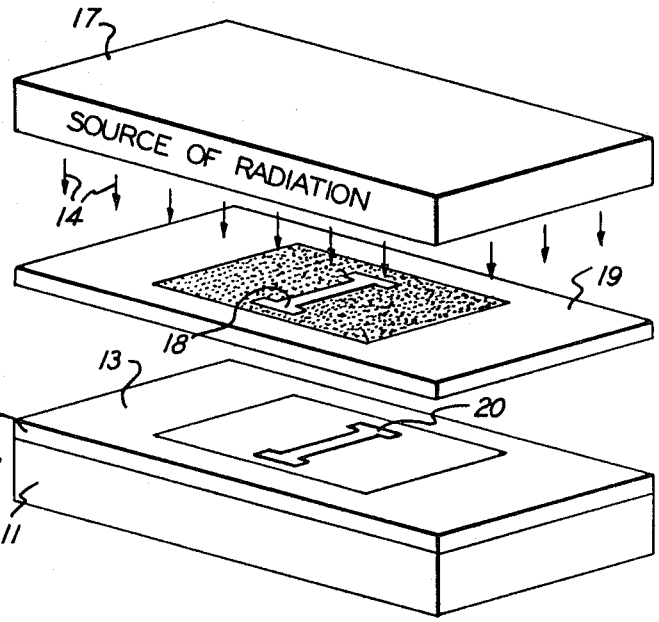
FIG. 5 is a partially schematic, isometric view of the imaging step in the present invention.

In FIG. 5 one embodiment of the novel imaging method of the present invention is shown in partially schematic, isometric view wherein the migration-type imaging member 10 is shown being exposed to the activating electromagnetic radiation 14 of sufficient energy to create the inventive image, with the radiation coming from source 17 passing through the transmissive portions 18 of an imagewise mask, stencil, or pattern 19, thereby forming an image 20 in the areas of the imaging member 10 which are exposed to the activating electromagnetic radiation. In the exposed areas, the agglomerable migration marking material simultaneously imagewise migrates at least in depth in the softenable layer and agglomerates to create sufficient contrast densities to form useful images as described herein.

The imagewise exposure step in the advantageous system of the present invention typically comprises exposing the aforementioned imaging members with a short duration exposure of electromagnetic radiation of high intensity. In the present invention, radiation of high intensity is intended to mean radiation with radiant energies in the range between about 0.001 and about 0.3 joules/cm$^2$ in exposures of duration in the range between about 10 and about $10^5$ microseconds, although in various embodiments, somewhat shorter or longer exposure durations may be suitable for the production of satisfactory images by the inventive system. This radiation also typically is of wavelengths in the range between about 2,000 Å and about 26,000 Å. The radiation sources useful in the present invention typically emit radiant energy which comprises at least heat and light, as indicated by the wavelength and energy ranges above.

The short duration, high intensity, flash imaging technique of the present invention is particularly advantageous because the energy imparted to the imaging member is not continuously applied and therefore has little time in which to be conducted away to other portions of the imaging member. The energy is so quickly applied to such localized areas of the imaging member, that the local effects occur before the energy has time to be conducted away from the imaged areas. These factors contribute to the high resolutions which are a characteristic result of the present imaging system. Images of resolution of about 168 lines/mm and contrast densities greater than about 1 may be produced by the inventive system.

The local effects in the exposed areas of the imaging member of the present invention are believed to be heating effects wherein the softenable layer or matrix is softened to a state of reduced resistance to migration of the agglomerable migration marking material, and the agglomerable material is simultaneously raised to a temperature above its fusion temperature. As a result, the agglomerable migration marking material, surprisingly, migrates at least in depth in the softenable layer (without any externally applied force other than the energy from the flash exposure) and simultaneously agglomerates and fuses into larger particles which, over a given area have smaller total cross-sectional opaque areas than a comparable unimaged area of the same imaging member.

Gas discharge lamps and lasers are suitable sources of the short duration, high intensity radiation which is suitable for use in the present invention. A xenon gas discharge flash lamp is a particularly preferred source of radiation of the preferred intensities.

Figure 6:
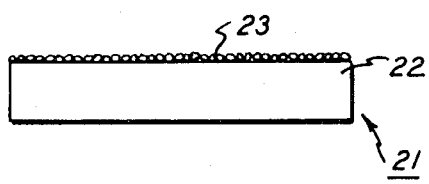
FIG. 6 is a partially schematic, cross-sectional view of another embodiment of an imaging member suitable for use in the present invention.

In still another embodiment, an imaging member such as that described in FIG. 6 may be used in a system which is generally in the scope of the present invention. In FIG. 6 imaging member 21 comprises a microscopically discontinuous layer of agglomerable material 22 deposited on a stable substrate 23. The term stable substrate herein means a substrate which is not degraded in the exposure step of the inventive process; the imaging material in this embodiment does not migrate in depth into the substrate. In this member the substrate 23 will typically be a material more viscous than the "softenable" materials of layer 12 and the members illustrated in FIGS. 1–3. Materials such as Mylar, a polyethylene terephthalate resin film available from DuPont, and any of the other substrate materials already described herein having viscosity or hardness about the same as or greater than the viscosity or hardness of Mylar are particularly preferred for use as substrates in the member illustrated in FIG. 6, although any stable substrate may be used. Materials suitable for use as the microscopically discontinuous layer of imaging material will typically have high absorption coefficients in the visible and infrared ranges to produce visible images by the process of agglomeration and fusion substantially as described above herein. However, in the present invention, no migration in depth of the imaging material into the substrate material is observed. Materials such as those comprising selenium, arsenic, silver, cadmium, zinc, tellurium, radiation absorbing pigments and dyes, and others, listed above herein are suitable for use in this mode of the invention.

Furthermore, the microscopically discontinuous material 23 may have a high vapor pressure along with high absorption coefficients in the visible and infrared ranges in order to facilitate production of a visible image by evaporation of the imagewise exposed portions of the microscopically discontinuous layer of imaging material. In this last described embodiment of the invention, the imaged member typically comprises a substrate having a microscopically discontinuous layer of imaging material having exposed image areas of the microscopically discontinuous layer evaporated from the imaging member in imagewise configuration.

As mentioned above, when the embodiment of the imaging member illustrated in FIG. 6 is processed by the methods of the present invention, the material in the microscopically discontinuous layer may agglomerate, fuse, or evaporate, depending upon the energy of the incident radiation, but no migration in depth is typically observed because of the stability (i.e., high viscosity or hardness) of the substrates used in this mode of the invention.

The following Examples further specifically define the present invention wherein a migration-type imaging member is provided and imaged in a system causing the agglomerable migration marking material in the exposed areas of said migration-type imaging member to migrate in depth in the softenable layer and agglomerate and fuse in the exposed areas. Another embodiment does not include the softenable layer. Parts and percentages herein are by weight unless otherwise indicated. The Examples below are intended to illustrate various preferred embodiments of the novel imaging system.

EXAMPLE I

An imaging member similar to that illustrated in FIG. 1 is prepared by roll coating an about 2 micron thick softenable layer comprising Staybelite Ester 10, a partially hydrogenated rosin ester available from Hercules Powder Co., onto an aluminized Mylar substrate, a polyethylene terephthalate film available from DuPont with a thin transparent aluminum coating thereon. A fracturable layer of amorphous selenium approximately 0.2 microns in thickness is provided contiguous the surface of the softenable layer by the vacuum evaporation process described in U.S. Pat. No. 3,598,644.

An optical mask, here a resolution target, is provided over the surface of the imaging member, and the imaging member is exposed at a distance of about 3 inches, by radiant energy in the illuminated areas of about $9 \times 10^{-2}$ joules/cm. by flashing a Novatron xenon flash lamp available from the Xenon Corporation, for a time duration of about 50 microseconds. The xenon lamp has an emission spectrum in the range between about 2,000 and 26,000 Å.

An imaged member containing a faithful replica corresponding to the optical mask image is produced by the above steps and this image comprises imaged areas comprising amorphous selenium particles migrated in depth in the softenable material and agglomerated and fused to form particles of larger diameter, but lesser total cross-sectional area in the imagewise exposed areas than in the originally vacuum evaporation coated areas of the imaging member.

EXAMPLE II

An imaging member is provided and imaged as in Example I by exposing to an imagewise pattern of electromagnetic radiation having energy in the illuminated areas of about 0.3 joules/cm$^2$. The resultant image is similar to the one described in Example I.

EXAMPLE III

An imaging member like that illustrated in FIG. 6 is prepared by vacuum evaporating a microscopically discontinuous layer of amorphous selenium, approximately 0.2 microns in thickness, on a substrate, here comprising Mylar, a polyethylene terephthalate resin available from DuPont. The vacuum evaporation process is carried out by the system disclosed in U.S. Pat. No. 3,598,644.

This imaging member is then exposed to an optical image by the method described in Example I using radiation of energy in illuminated areas of greater than about 0.2 joules/cm$^2$. This method provides a faithful image replica on the imaging member of the optical image mask. The image comprises less dense areas of selenium in the exposed areas where the microscopically discontinuous selenium layer has agglomerated and fused into particles of lesser total cross-sectional area, with the background portions of the imaging member comprising the original density of the microscopically discontinuous selenium layer.

EXAMPLE IV

The imaging process of Example III is carried out wherein the energy of the electromagnetic radiation in the exposed areas is greater than about 0.3 joules/cm$^2$. Here the imaged member comprises image areas substantially void of selenium, which is evaporated from the substrate, with background portions of the member comprising the original density of the microscopically discontinuous selenium layer.

In Examples III and IV, the image may be protectively fixed to the substrate by spraying an overcoating, for example, of a substantially transparent plastic such as Krylon (a colorless plastic believed to be an acrylic resin available from Krylon, Inc.) over the surface of the imaged member. Such protective overcoatings protect the members from abrasion, scratching, and foreign elements such as dust and insects.

Although specific components and proportions have been stated in the above description of preferred embodiments of this invention, other suitable materials and procedures such as those listed above, may be used with satisfactory results and various degrees of quality. In addition, other materials and stes may be added to those used herein and variations may be made in the process to synergize, enhance, or otherwise modify the properties of or increase the uses for the inventive system.

For example, in certain embodiments it may be advantageous to preheat the imaging member to a temperature below the agglomeration temperature of the imaging material, in order to increase the sensitivity of the imaging system.

It will be understood that various other changes of the details, materials, steps, arrangements of parts and uses which have been herein described and illustrated in order to explain the nature of the invention will occur to and may be made by those skilled in the art upon a reading of this disclosure, and such changes are intended to be included within the principles and scope of this invention.

What is claimed is:

1. An imaging method comprising:
   providing an imaging member comprising a stable substrate having a particulate discontinuous layer of agglomerable imaging material on one surface of said substrate, wherein the particles have an average size of not greater than about two microns, and
   imagewise exposing said member to an image pattern of electromagnetic radiation of sufficient energy to cause the agglomerable imaging material in the imagewise exposed areas to agglomerate and fuse whereby the total cross-sectional area of the exposed, fused imaging material is less than the total cross-sectional area of the unexposed, non-fused imaging material, thereby substantially reducing the visibility of said exposed material and providing an imagewise contrast with the unexposed material.

2. The method of claim 1 wherein said discontinuous layer of imaging material comprises particles of imaging material having average particle size not greater than about 1 micron.

3. The method of claim 2 wherein said discontinuous layer of imaging material comprises particles of said imaging material having average particle size not greater than about 0.5 microns.

4. The method of claim 2 wherein said particles of imaging material have particle-to-particle spacings not greater than about ½ micron.

5. The method of claim 1 wherein said imaging material comprises a material selected from the group consisting of: selenium, tellurium, arsenic, zinc, sulfur, gallium, cobalt tricarbonyl, and mixtures thereof.

6. The method of claim 1 wherein said imaging material comprises amorphous selenium.

7. The method of claim 1 wherein the step of imagewise exposing said member comprises exposing imagewise portions of said member to electromagnetic radiation of energy in the range between about 0.001 and about 0.3 joules/cm$^2$.

8. The method of claim 7 wherein said electromagnetic radiation is of wavelength in the range between about 2,000 Å and about 26,000 Å.

9. The method of claim 7 wherein the imagewise exposure is carried out for a time period in the range between about 10 microseconds and about $10^5$ microseconds.

10. The method of claim 7 wherein the source of said electromagnetic radiation is a Xenon gas discharge lamp.

11. The method of claim 7 wherein the source of said electromagnetic radiation is a laser.

* * * * *